Nov. 3, 1970    E. A. GRINDHEIM ET AL    3,538,355
CURRENT TRANSMITTER RESPONSIVE TO A D.C.
ISOLATED VOLTAGE SIGNAL
Filed May 27, 1968

FIG. I

INVENTOR.
Earl A. Grindheim
Charles E. Goetzinger

BY Robert R. Kooiman

Agent

United States Patent Office 3,538,355
Patented Nov. 3, 1970

3,538,355
CURRENT TRANSMITTER RESPONSIVE TO A
D.C. ISOLATED VOLTAGE SIGNAL
Earl A. Grindheim, Richfield, and Charles E. Goetzinger,
Bloomington, Minn., assignors to Rosemount Engineering Company, Minneapolis, Minn., a corporation of Minnesota
Filed May 27, 1968, Ser. No. 732,208
Int. Cl. G01k 7/02
U.S. Cl. 307—310          9 Claims

ABSTRACT OF THE DISCLOSURE

A circuit energized with direct current which is controlled by the circuit to be proportional to a low level voltage signal. The voltage signal source is D.C. isolated from those portions of the circuit which are D.C. connected to the power source and load.

BACKGROUND OF THE INVENTION

Field of the invention

This invention relates to automatic control of an electrical current in response to a D.C. isolated low level voltage signal. More specifically the invention relates to such a circuit where the two wires which carry power to a self balancing current control circuit also serve as the current signal transmission means. A specific means of obtaining isolation relates to effective switching of a capacitor repetitively at an input circuit and an output circuit.

Prior art

Prior art measuring systems are those which are used to convert a low level D.C. input signal to a direct current output signal while maintaining D.C. isolation between the input signal source and the output current signal. The desirability of providing such isolation is particularly important for thermocouple, or other low level voltage, inputs where some portion of the low level circuit may be intentionally, or accidentally, connected to an instrumentation power supply conductor or other source of different potential. A brief survey of such systems is given in the chapter titled, "Measuring and Transmission Methods" of the book Handbook of Applied Instruments, McGraw-Hill Book Company, 1964, Library of Congress Catalog Card No. 62–21926. In one such system, the low level current from a thermocouple passes through the field of a permanent magnet thereby deflecting a beam against a calibrating spring. Beam deflection is sensed by other circuitry which supplies a high level direct current suitable for transmitting to a recorder. A portion of the high level signal current is shunted through a feedback coil which opposes the force caused by the thermocouple current thereby maintaining a balanced position of the beam and controlling the high level current proportional to the low level thermocouple current. Other systems employ a balance motor driven by a high level signal current to control a potentiometer circuit in series with a thermocouple. The sum of the potentiometer and thermocouple sources is chopped and applied to the input of a differential amplifier which controls the balance motor.

While such systems do provide means for D.C. isolation of the low level input signal from a high level direct current, they require some type of electric motor positioning means to achieve such isolation. Other circuits have been proposed which use magnetic amplifier elements to achieve D.C. isolation of a low level D.C. input from a high level output signal. Such systems require carefully controlled A.C. power sources and also the accuracy of such a system is frequently limited by the design of the magnetic amplifier.

SUMMARY OF THE INVENTION

This invention comprises circuit means for controlling a D.C. load current precisely proportional to a low level D.C. signal voltage which is D.C. isolated from the load current. A differential input current controller responds to the sum of an unknown low level D.C. voltage signal and a D.C. feedback voltage signal by automatic adjustment of the total load current to achieve a balanced condition. The resulting D.C. voltage is converted to A.C. by a modulation stage and the A.C. signal is capacitively coupled to the current controller. The feedback voltage is controlled precisely proportional to total load current by means of an isolator stage. The isolator comprises a resistor in series with the load current and another feedback resistor in series mith the voltage signal and means to effectively switch a capacitor at high repetition rate from across first ends of the respective resistors to across the other ends of the resistors. Another capacitor is connected permanently across either the first ends or the other ends of the resistors to provide a reservoir of charge for the switchable capacitor and a further capacitor across the feedback resistor acts as a storage or filter element to maintain a D.C. voltage across the feedback resistor. For most accurate operation the feedback resistor is large in order to minimize current demands for that part of the circuit. The preferred form of the isolator employs FET's (field effect transistors) and an A.C. driver to provide the switch function without any moving parts. Because of the accurate transformation of load current to a feedback voltage across the feedback resistor the total load current is precisely proportional to the low level voltage signal, and the total electrical power and current signal is transmitted by the same pair of wires.

BRIEF DESCRIPTION OF THE DRAWINGS

FIG. 1 is a schematic showing the complete transmitter with portions in block form.

DESCRIPTION OF THE PREFERRED EMBODIMENTS

Figure 2:
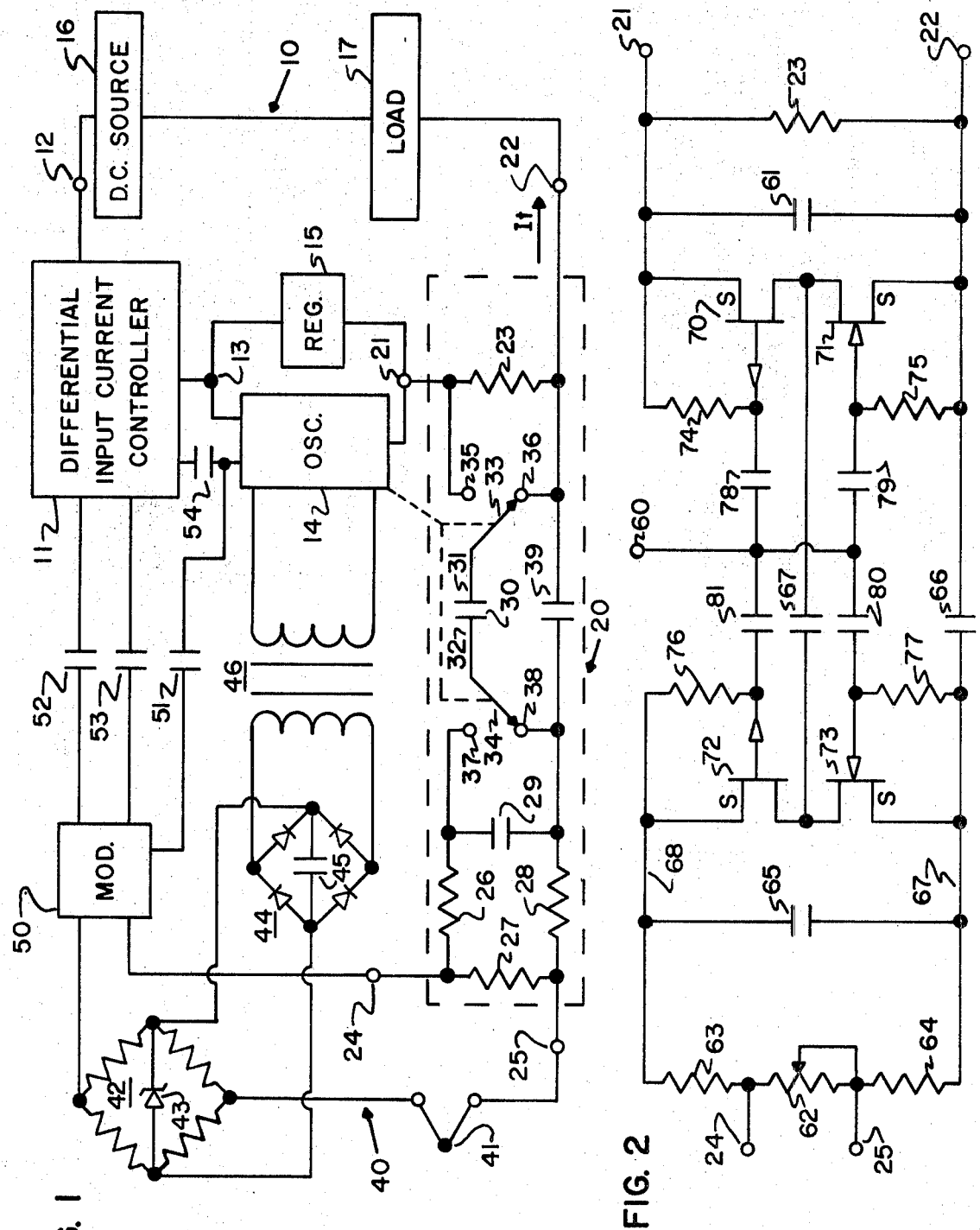
FIG. 2 is a detailed schematic of the preferred form of an isolator stage for the feedback portion of the circuit of FIG. 1.

Referring to the drawings and the reference notations thereon, FIG. 1 shows a current controller and an output circuit designated generally at 10. A differential input current controller 11 has its power input connected to terminal 12 and power return connected at junction 13. The parallel combination of an oscillator 14 and regulator 15 is connected between junction 13 and terminal 21. A load current resistor 23 is connected between terminal 21 and power return terminal 22. A D.C. source 16 and load 17 which may be located a considerable distance from the remainder of the circuit, connect between terminals 12 and 22 thereby completing a direct current loop. The total direct current $I_t$ flows through the load 17 and also through the load current resistor 23. Consequently, the voltage developed across resistor 23 is precisely proportional to the current flowing through load 17. Load 17 may include a recorder and/or indicating instrument responsive to the current $I_t$ in known manner.

An isolator stage designated generally at 20 reproduces this D.C. voltage from across resistor 23 to the series combination of resistors 26, 27 and 28 without requiring a D.C. connection between resistor 23 and resistors 26, 27 and 28. Terminals 24 and 25 are shown at opposite ends of resistor 27, and capacitor 29 is connected across the resistors 26, 27 and 28. The isolator 20 includes means to switch a charge transfer capacitor 30 from across a first end of resistor 23 and a first end of capacitor 29 to across the opposite ends of resistor 23 and capacitor 29 respectively. As shown the switch means comprises moveable arm 33 connected to end 31 of capacitor 30 and synchronously driven moveable arm 34 connected to end 32 of capacitor 30. Arm 33 alternately connects end 31 to terminals 35 and 37 at opposite ends of resistor 23 and arm 34 simultaneously alternately connects end 32 to terminals 37 and 38 across capacitor 29 which is connected across resistors 26, 27 and 28. Consequently, capacitor 30 is alternately switched from across terminals 35, 37 to across terminals 36, 38. A capacitor 39 is permanently connected between terminals 36 and 38. As shown, switch arms 33 and 34 are synchronously driven from oscillator 14.

When capacitor 30 is connected across capacitor 39 charge currents will flow in a direction to provide equal voltages across each of the capacitors 30 and 39. Then, assuming the existence of a potential difference between terminals 36 and 38, capacitor 30 will be charged in direction toward that potential difference when connected across 36, 38. The charged capacitor 30 is then switched to across terminals 35, 37 and if a potential difference exists across these terminals which is different from that across capacitor 30, a redistribution of charge will occur in a direction to minimize the difference in potentials. This charge distribution will show up primarily as a current between capacitor 30 and capacitor 29 and a resulting voltage across capacitor 29. A D.C. potential across capacitor 29 causes a direct current through resistors 26, 27 and 28 in a direction to reduce the potential across capacitor 29. The repetitive switching action of capacitor 30 functions, then, to deliver current to capacitor 29 in a direction to develop a potential across 35, 37 equal to that across 36, 38. This equality in turn insures that the potential across 35, 36 must be equal to that across 37, 38. The most accurate reproduction of voltage from terminals 35, 36 to terminals 37, 38 will occur for a high value of the resistor combination 26, 27, 28 since current through these resistors has to be maintained from the switching and charge transfer action described above. For a given value of resistance an increase in frequency of switching and in size of capacitors will improve accuracy. The isolator functions then, to develop a D.C. voltage across resistor 27 at terminals 24, 25 which is accurately proportional to the voltage across resistor 23 and does so without requiring a D.C. connection between resistor 27 and resistor 23.

Resistor 27 forms part of a low level signal input circuit designated generally at 40 and a feedback voltage is developed across resistor 27. Circuit 40 also includes a source of unknown D.C. potential which is shown as a thermocouple 41 in series with the output terminals of resistance bridge circuit 42 and both of these potential sources are shown in series with resistor 27. The D.C. potential source could be the output from a strain gage bridge or a resistance thermometer bridge for example, instead of the thermocouple. Since the low level signal path is D.C. isolated from the output current, a signal derived from the output current of that transmitter, or another similar transmitter could even be employed as the D.C. potential source to achieve a particular mathematical operation upon the variables. Bridge 42 is shown as a Wheatstone bridge having the bridge signal output terminals in series with thermocouple 41 and resistor 27 and the bridge power input terminals connected across a Zener diode 43 and the output of a full wave rectifier 44. Rectifier 44 comprises a diode bridge having its power input terminals connected across the secondary winding of transformer 46. Capacitor 45 is connected across the rectifier output. The primary winding of transformer 46 is driven from oscillator 14. Bridge 42 is used to provide an offset voltage to the circuit if desired and/or provide cold junction compensation for thermocouple 41. When used as a cold junction, compensator bridge 42 includes a resistance arm which is temperature responsive so that the bridge output which is summed directly with the thermocouple output will vary with temperature of the bridge. Accurate compensation may then be achieved in known fashion if the thermocouple reference junction is at the same temperature as the temperature responsive bridge elements.

In some instances of course the bridge 42 alone may be the condition sensing circuit. For example, a resistance thermometer in one leg of the bridge may be used to measure a desired temperature directly and terminal 25 would be connected directly to the bridge.

The series combination of the voltage feedback resistor 27, voltage signal source 41 and bridge 42 is connected across the input to modulator 50. Modulator 50 is driven by oscillator 14 through capacitor 51 and operates as a chopper to convert a D.C. input to modulator 50 to an A.C. output which is A.C. coupled through capacitors 52 and 53 to the input of differential input current controller 11.

An example of the specific circuitry which may be employed to serve as modulator 50 and differential input current controller 11 is described in copending application of Earl A. Grindheim, Ser. No. 661,988, filed Aug. 21, 1967 and assigned to the same assignee as the instant application. Oscillator 14 may be simply a conventional free-running multivibrator of sufficient capacity to drive modulator 50, a demodulator, bridge 42 and isolator 20. Regulator 15 connected across oscillator 14 may be simply a Zener diode since its function is primarily to hold a somewhat constant potential across oscillator 14 while passing a direct current of varying magnitude. Differential input current controller 11 comprises an A.C. amplifier, a demodulator stage driven from oscillator 14 through capacitor 54 and a direct current control stage.

A non-zero input to controller 11 from modulator 50 causes a change in the direct current $I_t$ through controller 11 in a direction to provide a decrease in the voltage input signal to modulator 50. The changed direct current provides a changed voltage across resistor 23 which produces a proportional change in voltage across feedback resistor 27 which is in series with the input circuit to modulator 50. Consequently, the circuit is self-balancing and continuously operable to provide a load current $I_t$ which is of known proportionality to a source of low level D.C. voltage in the signal circuit while providing D.C. isolation between the signal circuit and load circuit.

A preferred form of the isolator circuit 20 is shown in detail in FIG. 2 where the required switch means are shown as FET's (field effect transistors) so that no moving parts are required for operation of the isolator. The isolator circuit of FIG. 2 replaces isolator 20 of FIG. 1 by connecting into the FIG. 1 circuit at the respectively numbered terminals 21, 22, 24 and 25. Where the oscillator 14 is coupled schematically to the switch arms 33, 34 in FIG. 1, the output of oscillator 14 will be coupled to drive input terminal 60 of FIG. 2. The isolator of FIG. 2 has a current input stage comprising input terminals 21, 22 across load resistor 23 where resistor 23 is the same load resistor shown in FIG. 1. Capacitor 61 is connected across resistor 23 to smooth unwanted transient signals. A voltage output stage includes terminals 24, 25 across adjustable resistor 62. Resistor 62 is comparable to resistor 27 of FIG. 1 but is shown as an adjustable resistor to provide a seelctable transfer ratio between input and output of the isolator. Additional resistors 63 and 64 are in series with 62 to provide a high resistance output circuit and capacitor 65 is connected across the series combination of resistors 62, 63 and 64. Capacitor 66 is connected between a first end 67 of the output stage and a first end of the input resistor at terminal 22, and the function of capacitors 65, 66 is the same as that described in reference to capacitors 29, 39 respectively of FIG. 1. Capacitor 67 of FIG. 2 is comparable to capacitor 30 of FIG. 1 in its circuit function. As shown each of the input and output stages has a pair of FET's connected across the respective circuit. A first FET 70 is a positive turn-off (P-channel) type having its source connected to terminal 21 and a second FET 71 is a negative turn-off (N-channel) type having its source connected to terminal 22. The drains of transistor 70, 71 are connected together to a first side of capacitor 67. A third FET 72 is a positive turn-off type having its source connected to the second end 68 of the output circuit and a fourth FET 73 is a negative turn-off type having its source connected to output end 67. The drains of transistors 72, 73 are connected together to the other side of capacitor 67. Bias resistors 74, 75, 76 and 77 are respectively connected between the source and gate of transistors 70, 71, 72, and 73. Also, each of the transistors has one of the capacitors 78, 79, 80, 81 connected between its gate and the driver input terminal 60.

An A.C. signal applied to terminal 60 causes only transistors 70 and 72 to turn off during the positive half cycle thereby effectively switching capacitor 67 across input terminal 22 and output end 67. During the negative half cycle transistors 70, 72 are conducting and transistors 71 and 73 turns off thereby effectively switching capacitor 67 across input terminal 21 and output end 68. The result of this switching action is the same as that described in reference to FIG. 1 above and a D.C. voltage is provided across ends 67, 68 of the output circuit which is substantially identical to the voltage across input terminals 21 and 22.

In a test circuit transistors 70 and 72 were type 2N2609 and transistors 71 and 73 were type UC250. Capacitors 61 and 65 were 4.7 μf. Capacitors 66 and 67 were 1 μf. and capacitors 78, 79, 80, 81 were .047 μf. Resistors 74, 75, 76, 77 were each 10 megohms. A square wave signal of 12 volts peak to peak at 4 kHz. was applied to terminal 60 and the output voltage $V_0$ across ends 67, 68 was compared to an input voltage $V_1$ across terminals 21, 22 for various values of the sum $R_s$ of resistors 62, 63, and 64 across ends 67, 68. The measurements were as follows:

| Rs(ohms): | $V_1$(volts) | $V_0$(volts) |
|---|---|---|
| Infinite | 0 | 0 |
| Do | 3.000 | 3.000 |
| Do | 6.000 | 6.000 |
| 100k | 0 | 0 |
| 100k | 3.000 | 2.965 |
| 100k | 6.000 | 5.930 |
| 50k | 0 | 0 |
| 50k | 3.000 | 2.929 |
| 50k | 6.000 | 5.858 |
| 10k | 0 | 0 |
| 10k | 3.000 | 2.669 |
| 10k | 6.000 | 5.320 |
| 5k | 0 | 0 |
| 5k | 3.000 | 2.395 |
| 5k | 6.000 | 4.728 |

The experimental results above demonstrate that an extremely accurate D.C. voltage is provided at the output of the isolator circuit so long as the total load resistance is sufficiently high with relation to other circuit parameters. For the example above it is seen that the relation between $V_0$ and $V_1$ substantially linear for resistance loads of 50K ohms and larger. Results could be improved if desired by providing a higher drive frequency and larger capacitors at 66 and 67.

It is important that the switch elements have a high ratio of "off" resistance to "on" resistance and that the "on" resistance be relatively low. Field effect transistors such as those types described above exhibit such characteristics.

The transmitter described in reference to FIG. 1 provides a highly accurate direct current signal through a control of the total supply, or load, current from a supply circuit. The current is automatically controlled in response to a D.C. isolated signal which is summed with feedback signal derived from, but having D.C. isolation from, the total supply current. An isolator circuit provides the feedback signal accurately proportional to the total supply current. As shown a portion of the supply current may be used to energize isolated bridge 42 from a voltage regulated by Zener diode 43. The output of bridge 42 is summed with the feedback signal and contributes directly to the control of total supply current. For many instrumentation applications, the total supply current is required to vary between a minimum value and a maximum value in response to a signal voltage and bridge 42 is "offset" in a manner to provide for a given minimum supply current corresponding to a minimum signal, which might be zero volts for example. The corresponding minimum current may be 10 ma. and the maximum control current then would be 50 ma. to correspond with certain instrumentation practices.

What is claimed is:

1. A current transmitter having a pair of energization terminals for connection to a series circuit of a direct current source and load comprising a current controller operative from the load current and operable to control the load current in response to an input across a pair of signal input terminals, a load current resistor in series with the load current, a voltage signal source D.C. isolated from the load current, feedback resistor D.C. isolated from the load current, isolator means providing a D.C. voltage across the feedback resistor proportional to the current through the load current resistor, and means coupling the D.C. isolated voltage signal and feedback resistor voltage to the current controller signal input terminals.

2. A current transmitter having a pair of energization terminals for connection to a direct current source and load to control the total load current proportional to a D.C. isolated voltage comprising a current controller having a power input terminal, a power return terminal and alternating current signal input terminals, the controller being operative to vary the direct current therethrough in response to an alternating current signal, an oscillator energized by the direct current and providing a chopping signal, a load current resistor in series with the total current, a feedback resistor capacitively isolated from the total load current, isolator means energized by the load current to develop a D.C. isolated feedback voltage across the feedback resistor proportional to the total current, a source of unknown D.C. potential, a modulator having direct current input terminals and alternating current output terminals and operable from the chopping signal, alternating current coupling means connecting the modulator output terminals to the current controller input terminals, and means summing the unknown potential and the voltage across a portion of the feedback resistor at the modulator input.

3. The transmitter of claim 2 wherein the isolator comprises a first capacitor connected between a first end of the load current resistor and a first end of the feedback resistor, a second capacitor connected across the feedback resistor, a third capacitor, and repetitive switch means to alternately connect the third capacitor from across the first end of the load resistor and the first end of the feedback resistor to across the opposite ends of the load resistor and feedback resistor.

4. The transmitter of claim 3 including a resistance network having a first resistor proportional to a physical condition, a rectifier network connected to the resistance network for supplying direct current thereto and providing a voltage signal proportional to the first resistor, alternating current coupling means between the rectifier network and the oscillator, and means connecting the voltage signal to the modulator input.

5. An isolator for providing a direct voltage across an output circuit proportional to an input circuit direct voltage comprising an input circuit having first and second input terminals at opposite ends respectively of an input resistor, an output circuit including first and second output terminals at opposite ends respectively of an output resistor, a first capacitor connected between the first terminals of the input circuit and output circuit, a second capacitor connected between the first and second output terminals, a third capacitor, and repetitive switching means to alternately connect the third capacitor from between the first terminals of the input and output circuits to beween the second terminals of the input and output circuits.

6. The isolator of claim 5 wherein the switch means comprises a double throw, double pole switch having the third capacitor connected between the poles of the switch and wherein drive means are provided for synchronous and repetitive operation of the poles.

7. The isolator of claim 5 wherein the switch means comprises first, second, third, and fourth semiconductor switch elements which are selectively switchable from a conductive to a non-conductive state, means connecting the first and second elements between the first and second input terminals respectively and one end of the third capacitor, further means connecting the third and fourth elements between the first and second output terminals respectively and the opposite end of the third capacitor, and drive means to repetitively switch the switch elements from a conductive to a non-conductive state.

8. The isolator of claim 7 wherein the first and third elements are connected to the first terminals of the input and output circuits respectively and are adapted to change their state of conduction to a conducting state with application of a drive signal of a first polarity and the second and fourth elements are connected to the second terminals of the input and output circuits respectively and are adapted to change their state of conduction to the conducting state with applicaion of a drive signal of a second and opposite polarity.

9. The isolator of claim 8 wherein the semiconductor elements are field effect transistors.

References Cited

UNITED STATES PATENTS

| | | | |
|---|---|---|---|
| 3,088,073 | 4/1963 | Newbold et al. | 73—359 XR |
| 3,240,916 | 3/1966 | Bray et al. | 307—310 XR |
| 3,271,651 | 9/1966 | Diederich | 73—359 XR |
| 3,371,231 | 2/1968 | Burley | 307—310 XR |

STANLEY T. KRAWCZEWICZ, Primary Examiner

U.S. Cl. X.R.

73—359; 307—238, 251